(12) United States Patent
Wenzel et al.

(10) Patent No.: US 7,656,828 B2
(45) Date of Patent: Feb. 2, 2010

(54) TRANSMITTING RECEIVING ARRANGEMENT FOR TD-SCDMA MOBILE RADIOS

(75) Inventors: Dietmar Wenzel, München (DE); Berndt Pilgram, München (DE); Robert Denk, Grafing (DE)

(73) Assignee: Infineon Technologies AG, Munich (DE)

( * ) Notice: Subject to any disclaimer, the term of this patent is extended or adjusted under 35 U.S.C. 154(b) by 715 days.

(21) Appl. No.: 11/061,257

(22) Filed: Feb. 18, 2005

(65) Prior Publication Data
US 2005/0207362 A1 Sep. 22, 2005

(30) Foreign Application Priority Data
Feb. 24, 2004 (DE) ........................ 10 2004 008 920

(51) Int. Cl.
H04L 5/16 (2006.01)
(52) U.S. Cl. ........................ 370/296; 370/342
(58) Field of Classification Search .................. 370/152, 370/219; 375/276, 389; 455/88
See application file for complete search history.

(56) References Cited

U.S. PATENT DOCUMENTS

| | | | | |
|---|---|---|---|---|
| 5,892,792 | A * | 4/1999 | Walley | 375/152 |
| 6,111,860 | A * | 8/2000 | Braun | 370/276 |
| 6,148,182 | A * | 11/2000 | Thornton | 455/88 |
| 6,377,782 | B1 | 4/2002 | Bishop et al. | |
| 6,400,966 | B1 | 6/2002 | Andersson et al. | |
| 6,768,770 | B1 * | 7/2004 | Lipperer et al. | 375/219 |
| 2002/0132648 | A1 | 9/2002 | Kerth et al. | |
| 2003/0064692 | A1 | 4/2003 | Shi | |
| 2004/0076127 | A1 | 4/2004 | Porte | |
| 2004/0076156 | A1 * | 4/2004 | Furrer et al. | 370/389 |
| 2004/0204096 | A1 | 10/2004 | Hirsch et al. | |
| 2004/0228395 | A1 * | 11/2004 | Gunzelmann et al. | 375/219 |
| 2005/0119025 | A1 * | 6/2005 | Mohindra et al. | 455/552.1 |

FOREIGN PATENT DOCUMENTS

| | | |
|---|---|---|
| DE | 199 18 059 C1 | 11/2000 |
| DE | 100 35 116 A1 | 1/2002 |
| WO | WO 02/21719 A2 | 3/2002 |

OTHER PUBLICATIONS

China Wireless Telecommunication Standard (CSTS); 3G digital cellular telecommunications system; TD-SCDMA System for Mobile (TSM); Radio transmission and reception (Release 3)' CWTS TSM 05.05 V.3.0.0 (Aug. 2002). 45 pgs.
Final Office Action dated Apr. 3, 2008 issued to U.S. Appl. No. 10/794,297.
Office Action dated Apr. 16, 2007, for U.S. Appl. No. 10/794,297.
Office Action dated Oct. 31, 2007, for U.S. Appl. No. 10/794,297.

* cited by examiner

*Primary Examiner*—Chirag G Shah
*Assistant Examiner*—Otis L Thompson, Jr.
(74) *Attorney, Agent, or Firm*—Eschweiler & Associates, LLC

(57) ABSTRACT

The invention relates to a transmitting and receiving arrangement for radios having a baseband component and a radio-frequency component that are connected via an interface for interchanging payload data. The interface includes a bidirectional data link that can be operated in a half-duplex mode for transmission of digital payload data to be transmitted from the baseband component to the radio-frequency component and for transmission of received digital payload data from the radio-frequency component to the baseband component.

24 Claims, 3 Drawing Sheets

TRANSMITTING RECEIVING ARRANGEMENT FOR TD-SCDMA MOBILE RADIOS

REFERENCE TO RELATED APPLICATIONS

This application claims the benefit of the priority date of German application DE 10 2004 008 920.5, filed on Feb. 24, 2004, the contents of which are herein incorporated by reference in their entirety.

FIELD OF THE INVENTION

The invention relates to a transmitting and receiving arrangement for radios having a baseband component and a radio-frequency component that are connected via an interface for interchanging payload data in the transmission direction and the reception direction and a related method.

BACKGROUND OF THE INVENTION

Within transmitting and receiving arrangements in mobile stations, modulators and demodulators are used which modulate the data to be transmitted onto a radio-frequency carrier oscillation, and demodulate them for reception, in accordance with standardized modulation and demodulation methods. One of these mobile radio standards is the TD-SCDMA (Time Division Synchronous Code Division Multiple Access) Standard.

For simplicity, the TD-SCDMA method can be described as a combination of the GSM (Global System for Mobile Communications) method and the CDMA (Code Division Multiple Access) method. The transmission time is subdivided into time slots in the TD-SCDMA method in precisely the same way as in the GSM method. Furthermore, the data to be transmitted from a transmitter is coded using orthogonal code words in the sense of a code-division multiplexing method, with the TD-SCDMA method being characterized by a chip rate of 1.28 MHz. The orthogonal spread coding makes it possible for a number of users to transmit and to receive on the same frequency at the same time.

In the case of the TD-SCDMA method, the transmission and reception of signals by a subscriber do not take place at the same time, and, instead of this, a subscriber transmits and receives during different time slots. This so-called half-duplex method has the advantage that the transmitting and receiving arrangements do not need to be designed to be as complex. A further advantage of the TD-SCDMA method is that the data rates need not be symmetrical for the two transmission directions.

Further information relating to the TD-SCDMA Standard can be found in the TD-SCDMA specification "China Wireless Telecommunication Standard (CWTS); 3G digital cellular telecommunications system; TD-SCDMA System for Mobile (TSM); Radio transmission and reception (Release 3)", CWTS TSM 05.05 V.3.0.0 (2002-08).

Generally, the modulators and demodulators in transmitting and receiving arrangements in mobile stations comprise a baseband component and a radio-frequency component. During transmission, the baseband component uses digital signal processing to create a generally complex signal, which complies with the standard, from the data to be transmitted, wherein complex signal is shifted to radio frequency by the radio-frequency component and is transmitted via the antenna as a real signal after suitable amplification. During reception, the received payload data is demodulated in a corresponding form by the radio-frequency component to form a complex signal. The received data is then processed further in the baseband component.

Owing to the different physical requirements for the baseband and radio-frequency components, these functional units are generally produced in separate integrated circuits using different production technologies. In the transmission direction, the modulated baseband signal must be passed in a suitable form to the radio-frequency component. In the reception direction, the demodulated radio-frequency signal must be passed in a suitable form to the baseband component. A suitable interface must be provided between the baseband component and the radio-frequency component for this purpose.

In this case, the transmission between the baseband component and the radio-frequency component is normally in analogue form. However, this has the disadvantage that analogue components are also required both in the baseband component and in the radio-frequency component, which is disadvantageous, for example, bearing in mind the progress in digital semiconductor technologies.

In conventional mobile stations that are based on the TD-SCDMA Standard, a complex analogue signal, represented by a real and an imaginary part, is produced in a hybrid baseband module (mixed signal module) which has both digital and analogue circuit components, and, in order to achieve as high a signal transmission quality as possible, is transmitted to the radio-frequency assembly in the form of differential analogue signals, and is received by the radio-frequency assembly. Those circuit parts that are required for production and transmission of the differential signals in particular occupy a significant proportion of the chip area and are not required for the actual signal processing. As a result of the analogue transmission, the interface is also sensitive to radiated interference and noise, and requires four analogue line connections just for the transmission of the payload information.

In addition to the payload information, configuration information and synchronization information is transmitted via various analogue and digital control lines and via a serial bus, thus resulting in further lines.

The German Laid-Open Specification DE 100 35 116 A1 describes a conventional analogue radio-frequency interface for dual-standard baseband chips in mobile radios.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The invention is directed to a transmitting and receiving arrangement for radios having a baseband component, a radio-frequency component and an interface arranged between them, which offers advantageous cost and implementation benefits in terms of the aspects discussed above. The invention further comprises a mobile radio that includes the transmitting and receiving arrangement. The invention also comprises a method for transmission of data between a baseband component and a radio-frequency component having the above characteristics. In particular, the interface and the method may be employed in mobile radio transmission in accordance with the TD-SCDMA Standard.

The transmitting and receiving arrangement according to the invention is designed for radios, in particular for mobile radios, and comprises a baseband component, a radio-frequency component and an interface, via which the baseband component and the radio-frequency component can interchange payload data both in the transmission direction and in the reception direction.

One aspect of the invention comprises a digital interface for the transmission of the payload data rather than a conventional analogue interface. The digital interface according to the invention is considerably more immune to interference than an analogue interface, which is susceptible to radiated interference. Furthermore, there is no need for the analogue circuit components used in conventional interfaces. In addition, the invention supports baseband processing in the baseband component that is independent of the radio-frequency component. A further advantage of the digital interface is that the requirements for the design and circuit layout of the baseband component are reduced, since the baseband component can now be designed as a purely digital functional unit and can thus be produced using simpler and cheaper production technologies for exclusively digital circuits.

A further aspect of the invention is that the interface comprises a bidirectional data link which is operated using the half-duplex method. This data link is used to transmit not only digital payload data to be transmitted from the baseband component to the radio-frequency component, but also to transmit received, digitized payload data, which has been converted to baseband in the radio-frequency component, from the radio-frequency component to the baseband component. Since the data link is operated using the half-duplex method, the payload data is transmitted in only one direction via the data link during a specific time interval, in particular during a time slot. The bidirectional data link, which is operated using the half-duplex method, saves one data link in comparison to a conventional transmitting and receiving arrangement. Furthermore, this measure has the advantage that the transmitting and receiving arrangement according to the invention is particularly suitable for use in TD-SCDMA mobile radio systems.

The interface is configured for use in serial transmission of received digital payload data and of digital payload data to be transmitted via the data link. This results in the number of lines in the interface being kept low, in a cost-effective manner.

According to one advantageous embodiment of the invention, payload data is transmitted via the data link on a non-continuous basis and based on data bursts. In this case, the direction in which the payload data is transmitted via the interface is constant during the period of the burst. The transmission direction depends on whether this is a transmission burst or a reception burst. During the period of a transmission burst, the payload data is transmitted from the baseband component to the radio-frequency component, while the transmission of the payload data takes place in the opposite direction for a reception burst. These measures minimize the number of data links required for transmission of payload data. Furthermore, these measures assist the use of the transmitting and receiving arrangement according to the invention in a TD-SCDMA mobile radio system.

In principle, a single word clock line may be sufficient for indication of the start of transmission of a sequence of bits on the data link. However, according to one advantageous embodiment of the invention, the interface has a first and a second word clock line. The first word clock line indicates the start of transmission of a sequence of bits on the data link from the baseband component to the radio-frequency component, while the second word clock line is used for indication of the start of transmission of a sequence of bits on the data link from the radio-frequency component to the baseband component. The transmitting and receiving arrangement according to the invention improves the signal processing flexibility in the baseband component and in the radio-frequency component by allowing, for example, different word lengths for the transmission of digital transmission data and the transmission of digital received data. Furthermore, a situation arises in many transmitting and receiving arrangements in which less data need be transmitted in one direction than in the other. In this case, the described measure allows the data rate to be increased.

As an alternative to the first and second word clock lines, it is advantageously also possible to provide a third bidirectional word clock line. The third word clock line is used not only for indication of the start of transmission of a sequence of bits on the data link from the baseband component to the radio-frequency component, but also for indication of the start of transmission of a sequence of bits on the data link from the radio-frequency component to the baseband component. This refinement saves one line in comparison to the embodiment of the invention described above.

Furthermore, the data link, in one example, is designed differentially. The differential design of the data link allows transmission data to be transmitted without interference from the baseband component to the radio-frequency component, and allows received data to be transmitted without interference from the radio-frequency component to the baseband component, thus making it possible to achieve higher data rates as are required, in particular, for TD-SCDMA mobile radio systems.

The transmitting and receiving arrangement is designed in one example to transmit data words of the digital payload data, separated into a real part and an imaginary part, at a rate of $T_c^{-1}$. In this case, $T_c$ indicates the chip time period of the telecommunication standard on which the radio transmission is based. This makes it possible to ensure real-time operation for the interface. In the TD-SCDMA Standard, $T_c$=0.78 µs.

The transmitting and receiving arrangement is furthermore advantageously designed in one example such that data words of the received digital payload data are transmitted, separated into a real part and an imaginary part and in particular to an equivalent low-pass filter position, at a rate of $(T_c/2)^{-1}$, thus likewise making it possible to comply with real-time requirements.

In one example, the bit clock for the digital payload data to be transmitted and for the received digital payload data which are transmitted via the data link is produced from the received digital payload data itself. There is therefore no need to provide bit clock lines for the transmission of the corresponding bit clocks in the interface according to the invention. According to one preferred embodiment of the invention, the interface has a unidirectional system clock line, however, by means of which a system clock which is produced in the radio-frequency component is transmitted to the baseband component. In this case, the transmitting and receiving arrangement according to the invention is characterized by first and second clock divider means or clock multiplier means. The first clock divider means or clock multiplier means is located in the baseband component and uses the system clock to produce the bit clock for the digital payload data to be transmitted. In a corresponding manner, the second clock divider means or clock multiplier means is arranged in the radio-frequency component, and likewise uses the system clock to produce the bit clock for the digital payload data to be received.

A further preferred embodiment of the invention is characterized in that the interface has a bidirectional data line for serial transmission of configuration data between the radio-frequency component and the baseband component. In particular, the interface furthermore has a bit clock line for transmission of a clock signal. In this case, one bit, in particular, is transmitted via the bidirectional data line per clock period of the clock signal. A fourth word clock line that, in particular, the interface also has is used for indication of the start of transmission of a sequence of bits on the bidirectional data line. A refinement of the interface according to the invention such as this advantageously takes account of the architecture of the baseband processing, since it allows independent transmission of payload data and configuration data. Configuration data is data that, for example, determines the transmission frequency, the transmission amplitude, the transmission power profile, the type of modulation, the transmitter mode and further transmission and reception parameters. In this case, a single data line is sufficient for configuration data transmission, owing to the bidirectional data line, in order to transmit all the configuration data in both directions between the baseband component and the radio-frequency component, thus keeping the number of lines in the interface low.

The interface in one example contains a unidirectional activation and/or deactivation line, via which the baseband component can activate and/or deactivate the radio-frequency component. Furthermore, signal flanks can be transmitted via the activation and/or deactivation line in order to transmit time information from the baseband component to the radio-frequency component.

According to a further preferred embodiment of the invention, the baseband component contains a buffer store, in which both transmission data and received data can be temporarily stored. Furthermore, the payload data that is received by the radio-frequency component is transmitted to the baseband component immediately after its conversion to baseband and digitization. Provision is also made for the radio-frequency component to request the payload data to be transmitted via the data link from the baseband component. These measures have the consequence that there is no need for any data memory in the radio-frequency component. Furthermore, this results in better flexibility for the choice of the technology for the radio-frequency component.

In one example, the radio-frequency component is advantageously the master for the digital transmission of the payload data. In this example, this also applies to reception.

The transmitting and receiving arrangement according to the invention in one example is configured for radio transmission in accordance with the TD-SCDMA Standard. A number of reasons have already been stated above as to why the transmitting and receiving arrangement according to the invention accommodates radio transmission based on the TD-SCDMA Standard.

A mobile radio according to one aspect of the invention is configured for radio transmission in accordance with the TD-SCDMA Standard, in which case the radio transmission may be entirely subject to this Standard or, optionally, can also support the GSM Standard. Furthermore, the mobile radio according to the invention can also be upgraded by means of a coprocessor for the TD-SCDMA Standard. Since a transmitting and receiving arrangement according to the invention is integrated in the mobile radio according to the invention, the mobile radio has the advantages mentioned above.

A method according to the invention is also disclosed and used for transmission of data between a baseband component and a radio-frequency component of a transmitting and receiving arrangement for radios, in particular for mobile radios. In the method according to the invention, digital payload data to be transmitted is transmitted from the baseband component to the radio-frequency component via a bidirectional data link that is operated using the half-duplex method. Received, digitized payload data, which has been converted to baseband in the radio-frequency component, is also transmitted via this data link from the radio-frequency component to the baseband component.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text with reference, in the form of examples, to the drawings, in which.

DETAILED DESCRIPTION OF THE INVENTION

Figure 1:
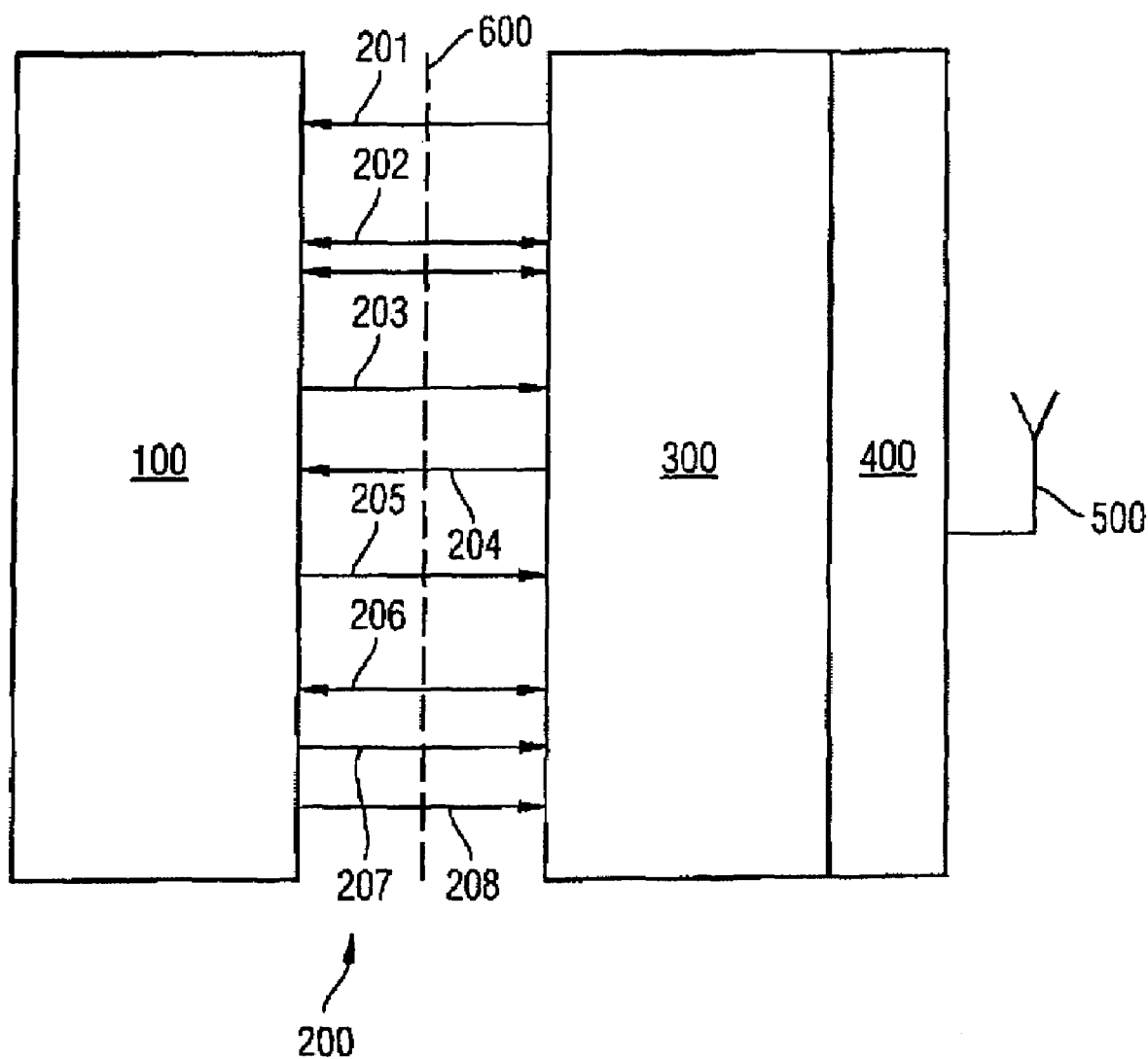
FIG. 1 is a schematic block diagram illustrating a first exemplary embodiment of the transmitting and receiving arrangement in accordance with the invention.

As a first exemplary embodiment of the invention, FIG. 1 shows a transmitting and receiving arrangement that is implemented in a mobile station in a mobile radio network based on the TD-SCDMA Standard. The transmitting and receiving arrangement has a baseband component 100, a digital interface 200, a radio-frequency component 300, a power amplifier 400 and an antenna 500. The baseband component 100 is connected to the radio-frequency component 300 via the digital interface 200. The power amplifier 400 is connected to the output side of the radio-frequency component, and is connected to the antenna 500.

The baseband component 100 has, in the normal manner, a digital signal processor, which is not illustrated in FIG. 1, for processing of payload data, as well as a microprocessor, which is likewise not illustrated in FIG. 1, which processes configuration data and carries out the sequence control for the entire transmitting and receiving arrangement.

The baseband component 100 carries out baseband processing of the data to be transmitted as well as the received data. This includes signal processing steps at the chip level. Signal processing steps at the physical level are carried out in the radio-frequency component 300.

The baseband component 100 and the radio-frequency component 300 in the present exemplary embodiment of the invention are each in the form of individual integrated circuits. The dashed line 600 indicates the module boundaries. The power amplifier 400 may also be in the form of an external component, that is to say it need not be implemented on the chip of the radio-frequency component 300.

The digital interface 200 between the baseband component 100 and the radio-frequency component 300 has two digital multiple conductor connections. A first digital multiple conductor connection, to which a system clock line 201, a differential data line 202 which is bidirectional and is operated using the half-duplex method, a transmission word clock line 203 and a reception word clock line 204 are allocated, is used for transmission of payload data in both directions. The second digital multiple conductor connection, to which an activation and deactivation line 205, a bidirectional data line 206, a word clock line 207 and a bit clock line 208 are allocated, is used primarily for transmission of configuration data from the baseband component 100 to the radio-frequency component 300. Furthermore, the second digital multiple conductor connection also allows data transmission in the opposite direction.

The payload data to be transmitted is transmitted via the differential data line 202 from the baseband component 100 to the radio-frequency component 300. The baseband component 100 provides the transmission word clock to the radio-frequency component 300 via the transmission word clock line 203. Since the data line 202 is designed for bidirectional data transmission, the received digital payload data is likewise transmitted from the radio-frequency component 300 to the baseband component 100 via the data line 202. The radio-frequency component 300 provides the reception word clock to the baseband component 100 via the reception word clock line 204. Alternatively, it is also possible to provide for both the transmission word clock and the reception word clock to be transmitted by only one bidirectional word clock line.

The payload data is transmitted via the data line 202 in accordance with the TD-SCDMA Standard using, in one example, the half-duplex method. In this case, the payload data is transmitted on a non-continuous basis and based on bursts. During the time period in which a reception burst is being received by the transmitting and receiving arrangement, only digital received data is transmitted via the data line 202 from the radio-frequency component 300 to the baseband component 100. During a transmission burst, digital transmission data is transmitted in the opposite direction via the data line 202.

The received payload data is provided to the baseband component 100 via the data line 202 immediately after reception by the radio-frequency component 300. Payload data to be transmitted is requested by the radio-frequency component 300 and only then is it transmitted to the radio-frequency component 300 via the data line 202. This results in less data memory being required in the radio-frequency component 300 since both the payload data to be transmitted and the received payload data can be temporarily stored in the baseband component 100. For this purpose, a buffer store 4 that is not illustrated in FIG. 1 is provided in the baseband component 100. In contrast, the radio-frequency component 300 has no buffer store.

In order to comply with real-time requirements, digital received data is transmitted at an effective sampling rate of at least twice the chip rate of 2.56 MHz via the data line 202, and digital transmission data is transmitted at the chip rate of 1.28 MHz.

All the analogue/digital converters and digital/analogue converters for the interface 200 are located in the radio-frequency component 300. Since, in consequence, there is no need for any analogue components for the transmission path and reception path in the baseband component 100, the baseband component 100 can be produced using simple and low-cost production technologies for exclusively digital circuits.

The system clock is transmitted via the system clock line 201 from the radio-frequency component 300 to the baseband component 100.

Digital configuration data is transmitted via the bidirectional data line 206. The word clock line 207 and the bit clock line 208 supply the word clock and the bit clock, respectively, to the radio-frequency component 300 from the baseband component 100.

The baseband component 100 can activate or deactivate the radio-frequency component 300 by means of the activation and deactivation line 205. Furthermore, time information can be transmitted via the activation and deactivation line 205 by the transmission of signal flanks.

Figure 2:
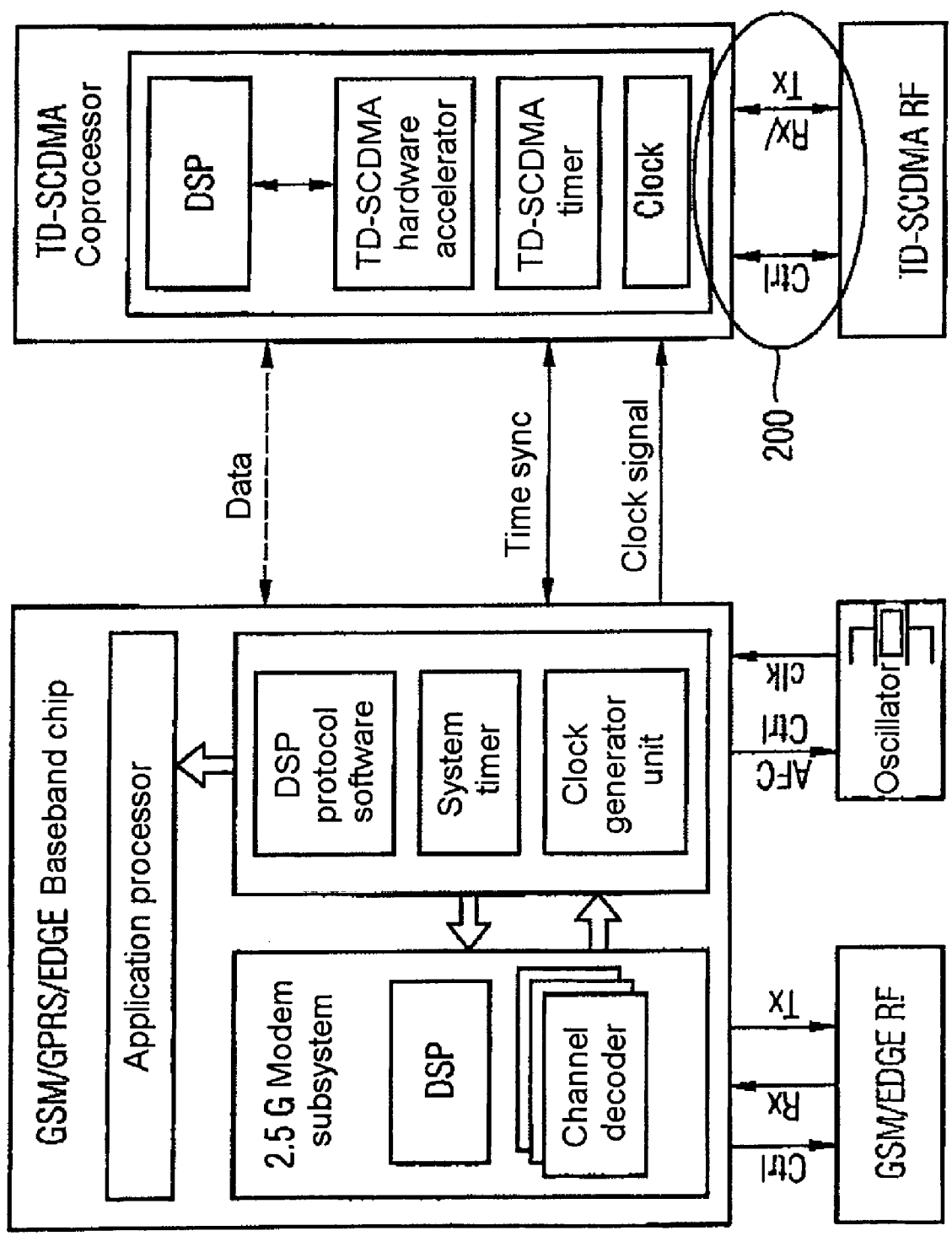
FIG. 2 is a schematic block diagram illustrating a multimode mobile station in accordance with a second exemplary embodiment of the invention.

FIG. 2 shows an exemplary schematic block diagram of a multimode mobile station in which a GSM/GPRS/EDGE baseband chip S-GOLD 2 produced by the applicant is connected to a TD-SCDMA coprocessor. A TD-SCDMA radio-frequency component TD-SCDMA RF is connected to the TD-SCDMA baseband component of the TD-SCDMA coprocessor via the digital interface 200 which has been described above.

Figure 3:
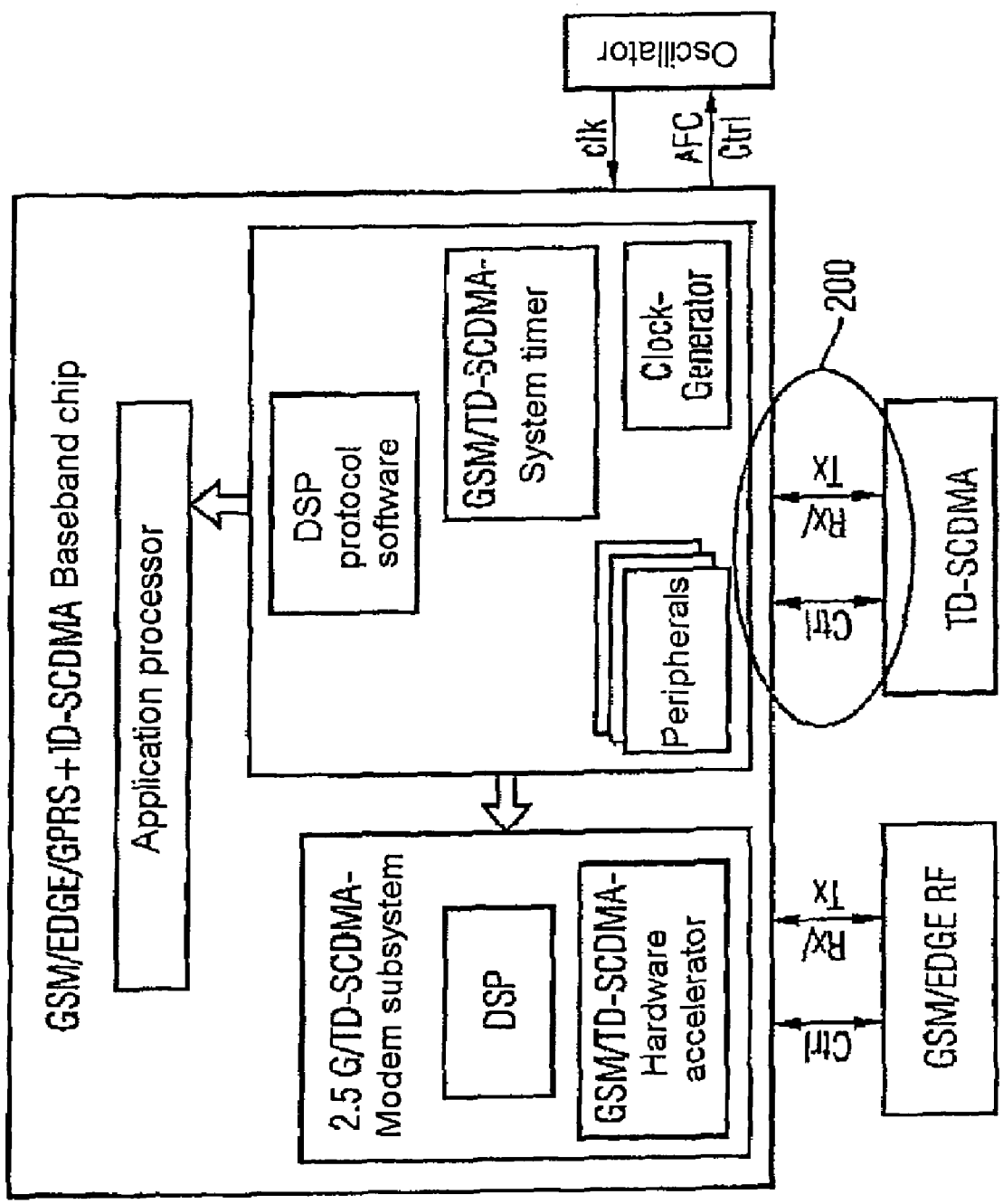
FIG. 3 is a schematic block diagram illustrating a further multimode mobile station with a third exemplary embodiment of the invention.

FIG. 3 shows an exemplary schematic block diagram of a further multimode mobile station. In this case, and in contrast to the multimode mobile station shown in FIG. 2, the baseband components for GSM/GPRS/EDGE and for TD-SCDMA are integrated in one chip. Since, in the present case, a digital interface is also used for the GSM/EDGE radio-frequency component GSM/EDGE RF, it is possible to design the baseband chip to be completely digital.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transmitting and receiving arrangement, comprising:
a baseband component;
a radio-frequency component;
an interface configured to interchange digital payload data in a transmission direction from the baseband component to the radio-frequency component and a reception direction from the radio-frequency component to the baseband component, the interface comprising a bidirectional data link configured to facilitate half-duplex transmission of the digital payload data to be transmitted from the baseband component to the radio-frequency component, and for transmission of received, digitized payload data, which has been converted to baseband in the radio-frequency component, from the radio-frequency component to the baseband component; and wherein the interface further comprises a third bidirectional word clock line configured to indicate a start of transmission of a sequence of bits on the data link from the baseband component to the radio-frequency component, and indicate a start of transmission of a sequence of bits on the data link from the radio-frequency component to the baseband component.

2. The transmitting and receiving arrangement of claim 1, wherein the baseband component and the radio-frequency component are configured to transmit the payload data therebetween via the data link on a non-continuous basis via a transmission burst or a reception burst, and wherein a transmission direction therebetween via the data link is constant during a period of the transmission burst or the reception burst.

3. The transmitting and receiving arrangement of claim 1, wherein the interface further comprises:
  a first word clock line configured to indicate a start of transmission of a sequence of bits on the data link from the baseband component to the radio-frequency component; and
  a second word clock line configured to indicate a start of transmission of a sequence of bits on the data link from the radio-frequency component to the baseband component.

4. The transmitting and receiving arrangement of claim 1 wherein the data link comprises a differential data link.

5. The transmitting and receiving arrangement of claim 1, wherein the baseband component and the radio-frequency component are configured to transmit data words of the digital payload data therebetween via the interface at a rate of $T_c^{-1}$, where $T_c$ is a chip time period of a telecommunication standard on which a radio transmission associated therewith is based.

6. The transmitting and receiving arrangement of claim 1 wherein the baseband component and the radio-frequency component are configured to transmit data words of the received digital payload data therebetween via the interface at a rate of $(T_c/2)^{-1}$, where $T_c$ is a chip time duration of a telecommunication standard on which a radio transmission associated therewith is based.

7. The transmitting and receiving arrangement of claim 1, wherein the interface further comprises a unidirectional system clock line configured to transmit a system clock produced in the radio-frequency component to the baseband component.

8. A transmitting and receiving arrangement, comprising:
  a baseband component;
  a radio-frequency component;
  an interface configured to interchange digital payload data in a transmission direction from the baseband component to the radio-frequency component and a reception direction from the radio-frequency component to the baseband component, the interface comprising a bidirectional data link configured to facilitate half-duplex transmission of the digital payload data to be transmitted from the baseband component to the radio-frequency component, and for transmission of received, digitized payload data, which has been converted to baseband in the radio-frequency component, from the radio-frequency component to the baseband component;
  a bidirectional data line configured to serially transmit configuration data between the radio-frequency component and the baseband component;
  a bit clock line configured to transmit a clock signal, and wherein one bit of digital payload data is transmitted via the bidirectional data line per clock period of the clock signal; and
  a fourth word clock line configured to indicate a start of transmission of a sequence of bits on the bidirectional data line.

9. The transmitting and receiving arrangement of claim 1, wherein the interface further comprises a unidirectional activation or deactivation line configured to activate or deactivate, respectively, the radio-frequency component by the baseband component, or configured to transmit time information from the baseband component to the radio-frequency component.

10. The transmitting and receiving arrangement of claim 1, wherein the baseband component comprises a buffer store configured to store digital payload data, and wherein the radio-frequency component is configured such that analog payload data received by the radio-frequency component from an antenna is transmitted directly to the baseband component once it has been converted to baseband and has been digitized, and wherein the radio-frequency component requests digital payload data to be transmitted from the baseband component thereto via the data link.

11. The transmitting and receiving arrangement of claim 1, wherein the radio-frequency component is configured as a master for the transmission of the digital payload data via the data link during transmission or reception.

12. A method for data transmission between a baseband component and a radio-frequency component in a mobile radio, comprising:
  transmitting digital payload data from the baseband component to the radio-frequency component;
  transmitting received, digitized payload data, which has been received from an antenna and converted to baseband in the radio-frequency component, from the radio-frequency component to the baseband component,
  wherein the transmitting occurs via a bidirectional data link in a half-duplex fashion; and
  transmitting first word clock control information for indication of a start of transmission of a sequence of bits on the data link from the baseband component to the radio-frequency component, and transmitting second word clock control information for indication of a start of transmission of a sequence of bits on the data link from the radio-frequency component to the baseband component are transmitted via a third bidirectional word clock line.

13. The method of claim 12, wherein the transmissions of the payload data via the data link occur on a non-continuous basis, and wherein a transmission direction via the data link is constant during a period of a transmission burst from the baseband component to the radio-frequency component or a reception burst from the radio-frequency component to the baseband component.

14. The method of claim 12, further comprising:
  transmitting first word clock control information for indication of a start of transmission of a sequence of bits on the data link from the baseband component to the radio-frequency component via a first word clock line; and
  transmitting second word clock control information for indication of a start of transmission of a sequence of bits on the data link from the radio-frequency component to the baseband component via a second word clock line.

15. The method of claim 12, wherein transmitting the payload data comprises transmitting the payload data in a differential format via the data link.

16. The method of claim 12, wherein data words of the digital payload data are transmitted at a rate of $T_c^{-1}$, where $T_c$ is a chip time period of a telecommunication standard on which a radio transmission associated therewith is based.

17. The method of claim 12, wherein data words of the received digital payload data are transmitted at a rate of $(T_c/2)^{-1}$, where $T_c$ is a chip time duration of a telecommunication standard on which a radio transmission associated therewith is based.

18. The method of claim 12, further comprising:
producing a system clock signal in the radio-frequency component; and
transmitting the system clock signal to the baseband component via a unidirectional system clock line.

19. A method for data transmission between a baseband component and a radio-frequency component in a mobile radio, comprising:
transmitting digital payload data from the baseband component to the radio-frequency component;
transmitting received, digitized payload data, which has been received from an antenna and converted to baseband in the radio-frequency component, from the radio-frequency component to the baseband component,
wherein the transmitting occurs via a bidirectional data link in a half-duplex fashion;
transmitting configuration data between the radio-frequency component and the baseband component in a serial form via a bidirectional data line;
transmitting a clock signal via a bit clock line, wherein one bit of configuration data is transmitted via the bidirectional data line per clock period of the clock signal; and
transmitting word clock control information for indication of a start of transmission of a sequence of bits on the bidirectional data line via a fourth word clock line.

20. The method of claim 12, further comprising:
activating or deactivating the radio-frequency component by the baseband component via a unidirectional activation or deactivation line; or
transmitting time information to the radio-frequency component via the unidirectional activation or deactivation line.

21. The method of claim 12, wherein received digital payload data from the radio-frequency component and payload data to be transmitted to the radio-frequency component are temporarily stored in a buffer store in the baseband component, and wherein the payload data received by the radio-frequency component is transmitted directly to the baseband component once it has been converted to baseband and has been digitized, and wherein the radio-frequency component requests payload data to be transmitted from the baseband component via the data link.

22. The method of claim 12, wherein the radio-frequency component is a master for transmission of the payload data via the data link during transmission between the radio-frequency component and the baseband component.

23. A method for data transmission between a baseband component and a radio-frequency component in a mobile radio, comprising:
transmitting digital payload data from the baseband component to the radio-frequency component;
transmitting received, digitized payload data, which has been received from an antenna and converted to baseband in the radio-frequency component, from the radio-frequency component to the baseband component,
wherein the transmitting occurs via a bidirectional data link in a half-duplex fashion;
transmitting configuration data between the radio-frequency component and the baseband component in a serial form via a bidirectional data line;
transmitting a clock signal via a bit clock line, wherein one bit of configuration data is transmitted via the bidirectional data line per clock period of the clock signal; and
transmitting word clock control information for indication of a start of transmission of a sequence of bits on the bidirectional data line via a fourth word clock line transmitting the payload data comprises transmitting the payload data in a differential format via the data link.

24. The method of claim 23, wherein the transmitting is in a differential synchronous format via the data link.

* * * * *